United States Patent [19]
Bieda

[11] Patent Number: 5,815,654
[45] Date of Patent: Sep. 29, 1998

[54] METHOD FOR DETERMINING SOFTWARE RELIABILITY

[75] Inventor: John Bieda, Waterford, Mich.

[73] Assignee: Chrysler Corporation, Auburn Hills, Mich.

[21] Appl. No.: 732,624

[22] Filed: Oct. 16, 1996

Related U.S. Application Data

[60] Provisional application No. 60/017,957 May 20, 1996.
[51] Int. Cl.⁶ ..................................................... G06F 11/00
[52] U.S. Cl. ....................................................... 395/183.14
[58] Field of Search ...................... 395/183.01, 183.13, 395/183.14, 701, 704

[56] References Cited

U.S. PATENT DOCUMENTS

| | | | |
|---|---|---|---|
| 5,475,843 | 12/1995 | Halviatti et al. ......................... | 395/700 |
| 5,652,835 | 7/1997 | Miller ................................... | 395/183.14 |

OTHER PUBLICATIONS ce 1995 IEEE pp. 38–46.
Itoh et al. "Ordered Sequence Testing Criteria for Concurrent Program and the Support Tool", 1994 IEEE, pp. 236–245.

Nakagawa et al. "Error Complexity Model for Software Reliability" (Transactions of the Institute of Electronics, information and Communication Engineers D–I (Jun. 1991) vol. J74D–I, No. 6, pp. 379–386.).

*Primary Examiner*—Albert Decady
*Attorney, Agent, or Firm*—Roland A. Fuller, III

[57] ABSTRACT

A method for determining the reliability of software includes determining a total number of software input combinations, and then determining a matrix of test input combinations that is a subset of the total number. The software is tested for each test input combination, and the ratio of the number of successful tests to the number of test input combinations, coupled with an effectiveness ratio that is determined by the number of test input combinations divided by the total number of input combinations, represents the efficacy of the software testing. Future software errors are predicted based on the testing, and a decision whether to continue software modification and testing is made in response to the prediction of future software errors and the indicated efficacy of the software testing.

9 Claims, 2 Drawing Sheets

METHOD FOR DETERMINING SOFTWARE RELIABILITY

This application is a United States patent application based on U.S. Provisional patent application Ser. No. 60/017,957 filed May 20, 1996, priority to which is claimed.

FIELD OF INVENTION

The present invention relates generally to systems and methods for software testing, and more particularly to methods for indicating and predicting the effectiveness of a time-independent software test regime.

BACKGROUND OF THE INVENTION

As computer software applications expand, the need becomes acute to assess the reliability of the software such that appropriate corrective action can be taken prior to releasing the software. Assuring the reliability of software by effective testing helps to minimize software development program costs, improve software quality, increase programmer productivity, and shorten the software development period.

Not surprisingly, many systems for testing software have been developed, to detect errors in the software before the software is released for use. Thereby, the reliability of the software is improved. Also perhaps not surprisingly, existing software testing systems mimic the older, time-dependent methodology of electronic hardware testing.

More particularly, the reliability of electronic hardware has traditionally been assessed by operating a sample of the hardware over a predetermined test period (colloquially referred to as a "burning in" period). During the burning in period, weaknesses in the hardware can be detected as the weaknesses produce failures. Based on the number of weaknesses detected over time, the reliability of the hardware can be assessed. Such "burning in" of hardware makes sense in assessing its reliability, because most, if not all, hardware weaknesses are related to physical deficiencies that can best be exposed by prolonged testing over time.

As recognized by the present invention, however, software reliability is generally not related to physical deficiencies. Rather, as recognized herein software errors typically are produced by unforeseen data input combinations, the existence of which are independent of time. Accordingly, time-dependent testing methods, while suitable for assessing the reliability of hardware, are not appropriate for assessing software, in that they fail to recognize the time independence of software reliability.

As further recognized herein, a large number of possible software input combinations might exist for a particular program. Consequently, it might be impractical to test each and every input combination. Nevertheless, the present invention understands that a measure of software reliability can be provided, even when it is not practical to test every possible input combination.

Accordingly, it is an object of the present invention to provide a method for assessing the reliability of software. Another object of the present invention is to provide a method for assessing the reliability of software that is not time-dependent. Still another object of the present invention is to provide a method for assessing the reliability of software that accounts for all data input combinations in producing a measure of software reliability, without necessarily testing each possible input combination. Yet another object of the present invention is to provide a method for assessing the reliability of software that is easy to use and cost-effective.

SUMMARY OF THE INVENTION

A method is disclosed for predicting an error rate of a computer software product having a total number of input combinations. As set forth in detail below, the method includes determining a test number of input combinations, with the test number of input combinations being a subset of the total number of input combinations. Also, the method includes determining an effectiveness ratio of the test number to the total number, and then testing the computer software program for each of the test number of input combinations to render a number of successful tests. A success ratio is then determined of the number of successful tests to the test number of input combinations. Based on the ratios, it is determined whether to undertake further testing of the software.

Preferably, an error number is defined by the difference between the test number and the number of successful tests in a test period, and the method further includes determining a predicted number of future errors in the computer software program based on the product of the error number and a power of the ratio of a future period to the test period. The method still further contemplates determining whether to undertake further testing of the software based on the predicted number of future errors.

In the preferred embodiment, the computer software program has a first number of factors and a second number of operating zone elements, and the factors are associated with a third number of levels. The total number of input combinations is determined based on the first, second, and third numbers. More specifically, the total number of input combinations is the product of the second number raised to the first number, and the third number.

In another aspect, a computer program device medium includes a computer program storage device that is readable by a digital processing system. A means is on the program storage device embodying logic means recognizable by the digital processing system for determining the effectiveness of a quality assurance test of software having a number of software factors and factor levels, and a number of operating zone elements. The means for determining includes logic means for determining a total number of software input combinations based on the product of the number of operating zone elements raised to the number of software factors, times the number of factor levels. Also, logic means are included for deriving a test number of input combinations from the total number of software input combinations. Further, logic means undertake a respective software test for each of the test number of input combinations and recording the number of successful tests in response. Additionally, logic means return an effectiveness ratio of the test number to the total number, with the effectiveness ratio being representative of the test effectiveness. Logic means also return a reliability ratio of the number of successful tests to the test number, the reliability ratio being representative of the software reliability.

In still another aspect, a method is disclosed for predicting the future performance of software by determining a future number of software errors in a future test period characterized by a future designator. The method includes determining a test number of input combinations, with the test number of input combinations being a subset of a total number of input combinations possible for the software. An effectiveness ratio is then determined of the test number to the total number. Next, the computer software program is tested for each of the test number of input combinations to render a number of successful tests, and success ratio determined from the number of successful tests divided by the test number of input combinations.

Moreover, the method determines a first number of errors in a first test period characterized by a first designator and a second number of errors in a second test period characterized by a second designator. A first ratio is determined to be the ratio of the second number to the first number, with a second ratio being determined to be the ratio of the second designator to the first designator. The method also includes defining a growth index to be the ratio of the logarithm of the first ratio to the logarithm of the second ratio. The future number of software errors can then be defined to be the product of the second number and a future ratio of the future designator to the second designator, with the future ratio being raised to the growth index. The method then determines whether to modify the software based on the success ratio, effectiveness ratio, and future number of software errors.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
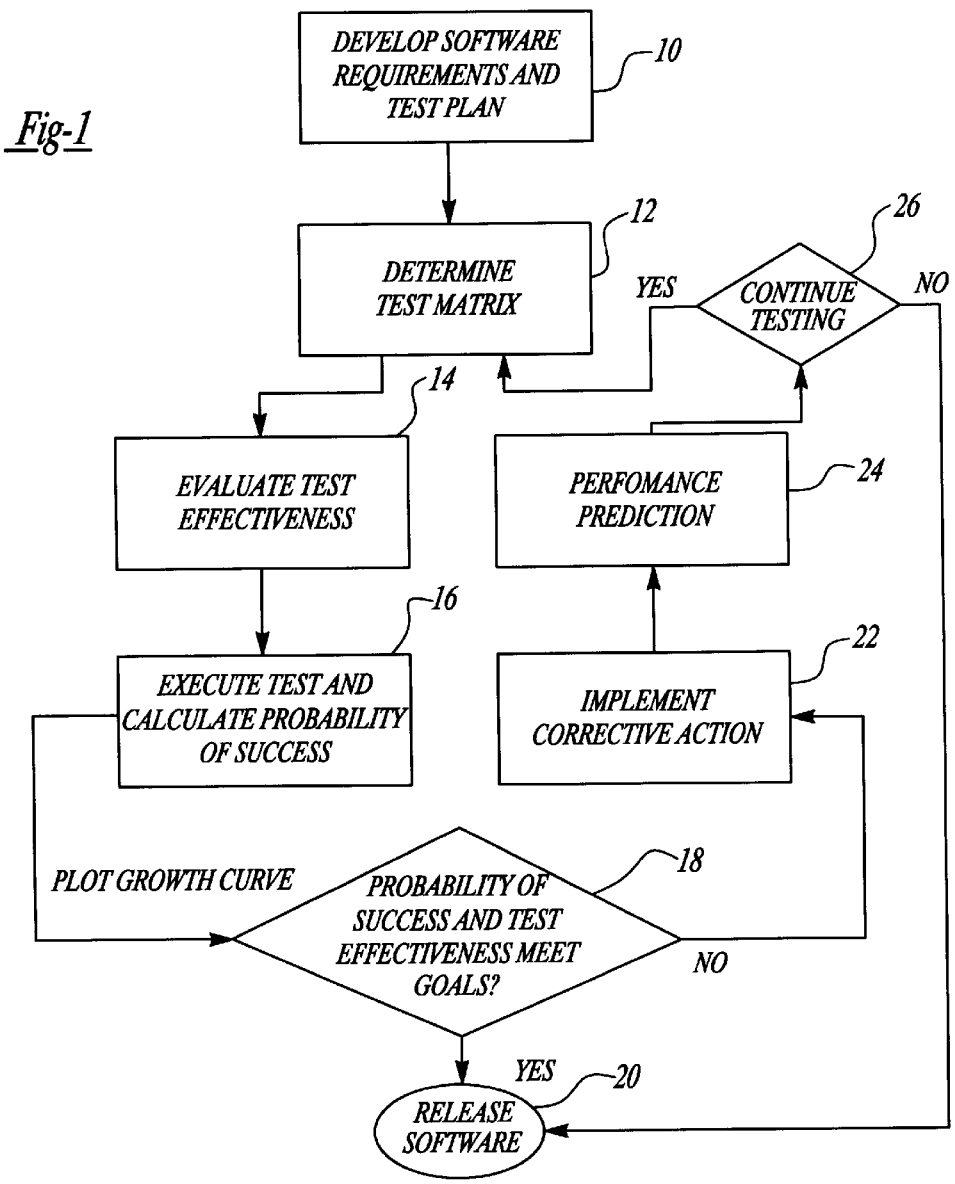
FIG. 1 is a flow chart of the method for assessing software reliability of the present invention.

Referring initially to FIG. 1, a method is shown for assessing the reliability of a computer software program, hereinafter referred to as "software". Commencing at step 10, the specification, i.e., requirements, of the software is developed in accordance with software development principles well-known in the art. Also, a software test plan is developed. The software test plan is developed to implement the test steps disclosed below.

Figure 2:
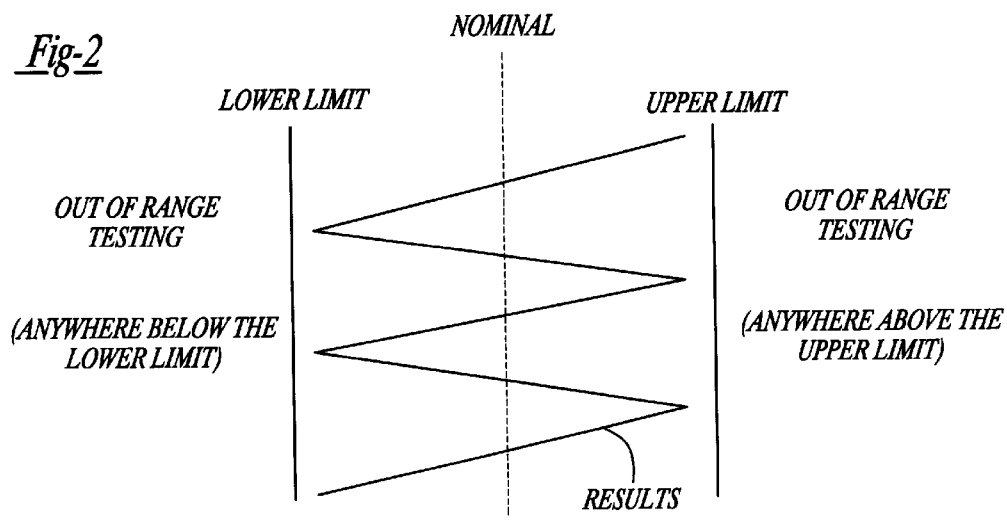
FIG. 2 is a schematic chart showing examples of operating zone elements.

At step 12, a test matrix is developed. As recognized by the present invention, it is ideally the case that all possible input combinations to the software be tested, and a test matrix covering all possible input combinations (referred to as a "full factorial" test) can be developed. To develop such a matrix (or set of matrices), all possible factors (i.e., input variables) with all possible factor levels (e.g., high, medium, low) for all possible operating zone elements. FIG. 2 shows an example of five operating zone elements (nominal, lower limit, upper limit, above upper limit and below lower limit). Such exhaustive testing, however, might be impractical.

Accordingly, as intended by the present invention, at step 12 a fractional factorial test matrix is developed. In a preferred embodiment, the fractional factorial test matrix is developed using so-called Taguchi orthogonal array approach known in the art and disclosed in Wu et al., "Quality Engineering Product & Process Design Optimization", American Supplier Institute, Dearborn, Mich. 1985; and *The Experimentation Process for Robust Design*, A. C. Rochester Engineering Processes Group, 1992. Stated differently, at step 12 a test number of input combinations is determined, with the test number of input combinations being a subset of the total possible number of input combinations.

Next, at step 14 the effectiveness of the test developed in step 12 is assessed. To assess the test effectiveness, the ratio of the test number of input combinations to the total possible number of combinations is determined as follows:

Test Effectiveness=$n/cb^a$, where n=test number of input combinations actually tested, from Taguchi matrix;

a=number of factors;

b=number of factor levels; and c=number of operating zone elements.

Next, at step 16 the designed tests from the Taguchi matrix are executed, and the probability of success calculated by determining the ratio of successful test responses to the test number of input combinations. Together, the test effectiveness ratio and the probability of success ratio provide an indication of the software's capability to successfully produce an output response.

Figure 3:
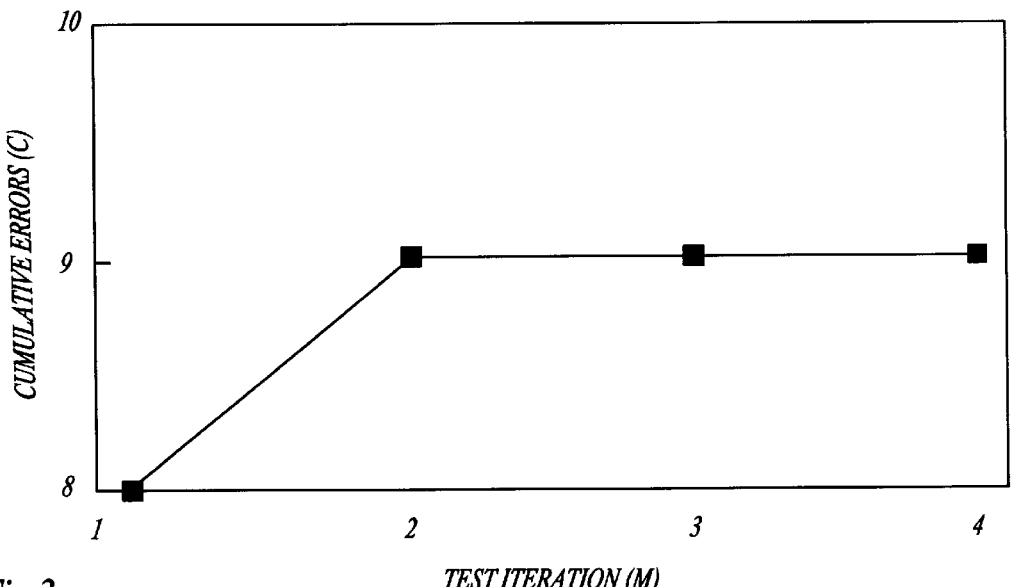
FIG. 3 is a graph of the results of an experiment using the method of FIG. 1, showing cumulative errors versus test iteration number.
Figure 4:
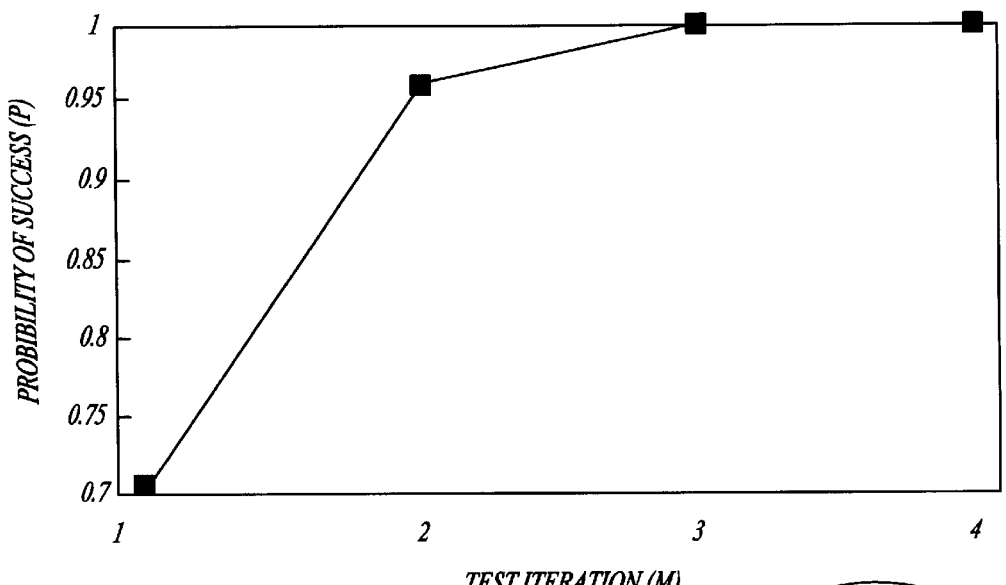
FIG. 4 is a graph of the results of an experiment using the method of FIG. 1, showing a predicted probability of success versus test iteration number.

Proceeding to decision step 18, it is determined whether the test effectiveness ratio and the probability of success ratio meet predetermined ratio goals. To aid in this determination, the test effectiveness ratio and/or probability of success ratio and/or cumulative test errors can be depicted in graphical form. FIGS. 3 and 4 show examples of the results of a software test battery. Specifically, FIG. 3 shows cumulative errors plotted versus test iteration number, in which eight errors were uncovered and corrected in a first test, one additional error was uncovered and corrected in a second iteration, and no further errors were uncovered in subsequent test iterations. FIG. 4, on the other hand, shows a graph of the probability of success ratio from iteration to iteration, as the ratio is determined after each iteration in accordance with the disclosure above.

Returning to FIG. 1, if the test effectiveness ratio and the probability of success ratio meet the predetermined ratio goals, the software is released at step 20. Otherwise, corrective action is implemented at step 22, and then future software performance predicted at step 24 to determine whether to conduct further testing of the software, as modified at step 22. This determination of whether to conduct further testing is undertaken at decision step 26 as shown. If it is desired to conduct future testing, the method loops back to step 12 to generate a new test matrix based on the modified software, and then the method proceeds as set forth above. Otherwise, the software is released at step 20.

In undertaking the prediction step 24, it is to be understood that the particular method described below depends on the following assumptions. First, it is assumed that software errors are independent of each other. Second, it is assumed that corrective actions take place to remove any errors that are identified. Third, it is assumed that when the software has been modified to correct errors, modified test matrices are generated as mentioned above to evaluate the new software.

With specific regard to the predictive undertaking at step 24, a growth index $\alpha$ is first determined as follows:

$\alpha=[\log(C_1/C_0)]/[\log(M_1/M_0)]$, where $C_0$ is the number of cumulative errors in an initial test period $M_0$; and $C_1$ is the number of cumulative errors in a follow-on test period $M_1$.

It is to be understood that the test periods "M" are represented in the equation above by a respective designator, such as the test period number, or test period length.

After determining the growth index α, future cumulative errors can be predicted by solving the above equation for $C_f$ as follows, wherein $C_f$ is the prediction of the future number of cumulative errors and $C_p$ is the present number of cumulative errors:

$$C_f = C_p(M_p/M_f)^\alpha$$

Figure 5:
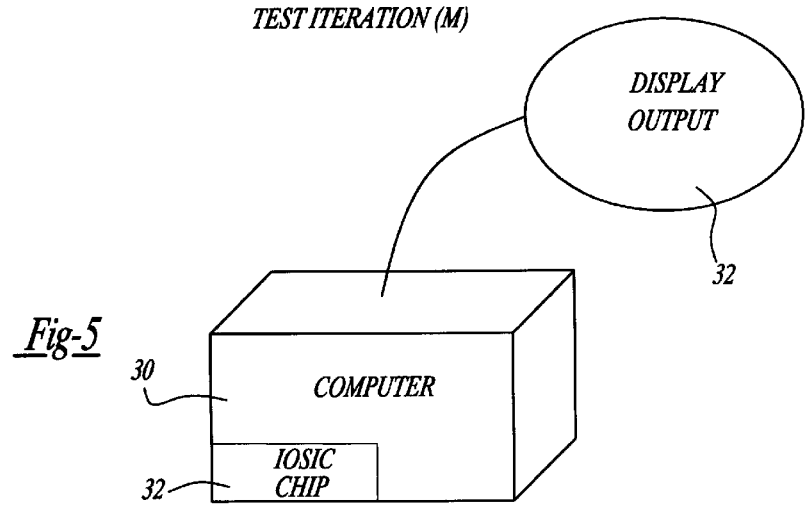
FIG. 5 is a schematic diagram showing a computer implementation of the present invention.

It is to be understood that certain of the above-disclosed method steps can be implemented on a device medium. In one embodiment, referring to FIG. 5 the device medium is implemented by logic circuits on a chip 28 in a computer 30. Alternatively, the device medium can be implemented by a circuit board (not shown), and the operative components of the device medium accordingly would be electronic components on the circuit board.

It is to be still further understood that the operations of the device medium could be embodied in a device medium such as software, i.e., in machine-readable form and stored on a computer program storage device. In other words, FIG. 1 can illustrate the structures as might be embodied in computer program software or in logic circuits. Those skilled in the art will appreciate that FIG. 1 can illustrate the structures of computer program code elements that function according to this invention. Manifestly, the invention might be practiced by a machine component that renders the computer program code elements in a form that instructs a digital processing apparatus (that is, a computer) to perform a sequence of function steps corresponding to those shown in the Figures.

When embodied in software, these instructions may reside on a program storage device including a data storage medium, such as can be found on a computer floppy diskette, on semiconductor devices, on magnetic tape, on optical disks, on a DASD array, on magnetic tape, on a conventional hard disk drive, on electronic read-only memory or on electronic random access memory, or other appropriate data storage device. In an illustrative embodiment of the invention, the computer-executable instructions may be lines of compiled $C^{++}$ language code.

While the particular METHOD FOR DETERMINING SOFTWARE RELIABILITY AS herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A method for predicting an error rate of a computer software product having a total number of input combinations, comprising the steps of:

determining a test number of input combinations, the test number of input combinations being a subset of the total number of input combinations;

determining an effectiveness ratio of the test number of input combinations to the total number of input combinations;

testing the computer software program for each of the test number of input combinations to render a number of successful tests;

determining a success ratio of the number of successful tests to the test number of input combinations; and determining whether to undertake further testing of the software based on the effectiveness and success ratios.

2. The method of claim 1, wherein an error number is defined by the difference between the test number of input combinations and the number of successful tests in a test period, and the method further comprises the steps of:

determining a predicted number of future errors in the computer software program based on the product of the error number and a power of the ratio of a future period to the test period; and determining whether to undertake further testing of the software based on the predicted number of future errors.

3. The method of claim 2, wherein the computer software program has a first number of factors and a second number of operating zone elements, the factors being associated with a third number of levels, and wherein the total number of input combinations is determined based on the first, second, and third numbers.

4. The method of claim 3, wherein the total number of input combinations is the product of the second number of operating zone elements raised to the first number of factors, and the third number of levels.

5. A computer program device medium comprising:

a computer program storage device readable by a digital processing system; and a means on the program storage device and embodying logic means recognizable by the digital processing system for determining the effectiveness of a quality assurance test of software having a number of software factors and factor levels, and a number of operating zone elements, comprising:

logic means for determining a total number of software input combinations based on the product of the number of operating zone elements raised to the number of software factors, times the number of factor levels;

logic means for deriving a test number of input combinations from the total number of software input combinations;

logic means for undertaking a respective software test for each of the test number of input combinations and recording the number of successful tests in response;

logic means for returning an effectiveness ratio of the test number of input combinations to the total number of input combinations, the effectiveness ratio being representative of the test effectiveness; and logic means for returning a reliability ratio of the number of successful tests to the test number of input combinations, the reliability; and logic means for determining whether to undertake further testing based on the effectiveness and reliability rations ratio being representative of the software reliability.

6. The device of claim 5, further comprising logic means for determining a predicted number of future errors in the computer software program based on the product of an error number and a power of the ratio of a future period to a test period, wherein the error number is defined by the difference between the test number of input combinations and the number of successful tests in the test period.

7. A method for predicting the future performance of software by determining a future number of software errors in a future test period characterized by a future designator, comprising the steps of:

determining a test number of input combinations, the test number of input combinations being a subset of a total number of input combinations possible for the software;

determining an effectiveness ratio of the test number of input combinations to the total number of input combinations;

testing the computer software program for each of the test number of input combinations to render a number of successful tests;

determining a success ratio of the number of successful tests to the test number of input combinations;

determining a first number of errors in a first test period characterized by a first designator;

determining a second number of errors in a second test period characterized by a second designator;

determining a first ratio to be the ratio of the second number of errors to the first number of errors;

determining a second ratio to be the ratio of the second designator to the first designator;

defining a growth index to be the ratio of the logarithm of the first ratio to the logarithm of the second ratio;

defining the future number of software errors to be the product of the second number of error and a future ratio of the future designator to the second designator, the future ratio being raised to the growth index; and determining whether to modify the software based on the success ratio, effectiveness ratio, and future number of software errors.

8. The method of claim 7, wherein the software has a first number of factors and a second number of operating zone elements, the factors being associated with a third number of levels, and wherein the total number of input combinations is determined based on the first number of factors, second number of operating elements, and third number of levels.

9. The method of claim 8, wherein the total number of input combinations is the product of the second number of operating zone elements raised to the first number of factors, and the third number of levels, and the third number.

* * * * *